US008944492B2

(12) United States Patent
Hufnagl et al.

(10) Patent No.: US 8,944,492 B2
(45) Date of Patent: Feb. 3, 2015

(54) VEHICLE FRAME (75) Inventors: Johannes Hufnagl, Jena (DE); Thomas Delos Santos, Jena (DE)

(73) Assignee: Innovative Mobility Automobile GmbH (DE)

( * ) Notice: Subject to any disclaimer, the term of this patent is extended or adjusted under 35 U.S.C. 154(b) by 0 days.

(21) Appl. No.: 13/639,579

(22) PCT Filed: Apr. 6, 2011

(86) PCT No.: PCT/EP2011/055365
§ 371 (c)(1),
(2), (4) Date: Mar. 27, 2013

(87) PCT Pub. No.: WO2011/124614
PCT Pub. Date: Oct. 13, 2011

(65) Prior Publication Data
US 2013/0187407 A1      Jul. 25, 2013

(30) Foreign Application Priority Data
Apr. 6, 2010  (DE) .......................... 10 2010 013 985

(51) Int. Cl.
*B60N 2/10* (2006.01)
*B60R 21/02* (2006.01)
*B62D 21/18* (2006.01)
*B62D 23/00* (2006.01)
*B62D 31/00* (2006.01)
*B62D 39/00* (2006.01)

(52) U.S. Cl.
CPC .............. *B60R 21/02* (2013.01); *B62D 21/183* (2013.01); *B62D 23/005* (2013.01); *B62D 31/003* (2013.01); *B62D 39/00* (2013.01); *B60N 2/10* (2013.01)

USPC .................. 296/190.01; 296/209; 296/203.01

(58) Field of Classification Search
USPC ............. 296/190.03, 203.01, 187.03, 187.12, 296/190.01, 65.02, 65.06, 193.06, 63, 64, 296/65.01
IPC .................................................. B60N 2/30,2/42
See application file for complete search history.

(56) References Cited

U.S. PATENT DOCUMENTS 3,922,029 A * 11/1975 Urai .............................. 296/68.1
4,217,970 A *  8/1980 Chika ............................ 180/298
4,614,249 A *  9/1986 Yamanaka .................... 180/312
4,810,028 A *  3/1989 Henricks ................... 296/187.03
6,073,986 A *  6/2000 Neale et al. ...................... 296/63

(Continued)

FOREIGN PATENT DOCUMENTS

FR              2559119 A1 *  8/1985   ............. B62D 31/00

*Primary Examiner* — Pinel Romain
(74) *Attorney, Agent, or Firm* — J.A. Lindeman & Co., PLLC (57) ABSTRACT The description relates to a vehicle frame (1) which forms a safety cell having at least one vehicle seat (5), wherein the vehicle frame (1) comprises at least a floor section (10) and a side sill (20), and wherein at least one transverse element (30) for absorbing transverse forces is provided which is connected to at least the side sill (20) and extends on both sides of the at least one vehicle seat (5), in particular below the vehicle seat, and is arranged above the floor section (10). The description also relates to a vehicle seat (110) which can be adjusted at least between a driving position and an access position, wherein a seat surface (113) of the vehicle seat is substantially horizontal in the access position and is inclined to the rear with respect to the access position in the driving position.

7 Claims, 7 Drawing Sheets

(56) References Cited

U.S. PATENT DOCUMENTS

| | | | |
|---|---|---|---|
| 6,474,728 B1 * | 11/2002 | Mendis et al. | 296/204 |
| D586,696 S * | 2/2009 | Burns | D12/87 |
| 7,506,910 B2 * | 3/2009 | Leitner et al. | 296/68 |
| 7,618,076 B2 * | 11/2009 | Meynet et al. | 296/65.01 |
| 7,658,258 B2 * | 2/2010 | Denney | 180/311 |
| 2009/0085376 A1 * | 4/2009 | Schmitt | 296/190.03 |
| 2009/0184534 A1 * | 7/2009 | Smith et al. | 296/64 |

* cited by examiner

VEHICLE FRAME

The present invention relates to a vehicle frame for motor vehicles and to a seat design for such a vehicle frame as well as to a vehicle frame with a seat arranged therein. In particular, the present invention relates to a lightweight and safe vehicle frame and further elements which can add to the passenger safety in such a vehicles frame.

It is known for long that the weight of a vehicle has a strong influence on energy consumption of motor vehicles. Efforts have been made to design vehicles as light and thus as energy saving as possible. Motor vehicles however, became heavier over the years. Besides more elaborate and thus more expensive designs, the increased safety requirements of motor vehicles and the additional comfort equipment are major hurdles for constructing vehicles lighter and reduced in weight.

The weight of the vehicle is an important parameter of electric driven vehicles, in particular if they comprise batteries as energy storage, to obtain sufficient cruising ranges with the available battery capacitances in order to achieve a broad acceptance by the customers or the users. In particular electric vehicles, there is the additional problem that the vehicle has to have additional battery capacity for each additional weight of the vehicle in order to accelerate this additional vehicle mass. A weight reduction in electric vehicles is therefore double effective. This a major disadvantage of common approaches to electric vehicles wherein existing vehicles are equipped with batteries and electric motors. These vehicles are heavier as the common vehicle they are built on due to the required batteries. It is therefore almost impossible to reach acceptable cruising distances and power output with the battery technology available today for solely electrically driven vehicles.

Electrically driven vehicles which are on the market today, however, do not provide a particular crash safety and cannot meet the safety regulations and safety standards that are today applied to passenger cars. There are only very limited safety regulations in Germany and in Europe relating to the crash safety for lightweight vehicles with a total weight (without battery) of up to 400 kg.

FR 255 911 9, for example, discloses a three wheel compact vehicle with a safety frame. This frame, however, does not provide any safety element at the side of an occupant, such that the occupant is almost unprotected in case of a side impact.

Most of the vehicle designs provide vehicle doors at the side of an occupant which makes the entry to and the exit from the vehicle possible—such an arrangement of vehicle doors is disadvantageous for a reliable side impact protection because an extremely rigid door frame has to be provided in order to deviate or divert the forces occurring during a side impact from the door into the vehicle frame. Therefore, the door frame design has to be correspondingly massive which leads together with the door itself to a substantially increased weight.

Other types of access to the vehicle are occasionally provided and only in smallest vehicles or lightweight vehicles. For example, the access can be provided through an turret that can be opened which is uncomfortable for a user and which requires some moving skills of the user. In many cases the seating position is very low such that the access to existing vehicles is not ergonomic. Besides these disadvantages, the requirements for the user safety are in most cases still not met.

WO 02/04969 describes a vehicle chassis and a frame design for a compact vehicle in which two circumferential bows connect a support brace in such a manner that they form a sort of a safety cage which also runs along the sides of an occupant. This design provides some protection in case of a side impact, it can, however, not meet the requirements which are standard today.

There is therefore a need for a light and save vehicle design which provides at light weight a good protection for an occupant in case of a side impact. There is also a need for a light and save vehicle design which provides an easy access.

SUMMARY OF THE INVENTION

This object is solved by a vehicle frame, a vehicle and a seat design according to the independent claims.

The vehicle frame forms a safety cell with at least one vehicle seat, wherein the vehicle frame comprises at least one undercarriage or base portion and a side sill, and wherein at least one transverse element for the uptake of transversal forces is provided which is connected to the side sill and which extends on both sides of the at least one vehicle seat, in particular below the vehicle seat and which is arranged above the undercarriage. Similar or symmetric side sills are usually arranged on both sides of the vehicle.

The transverse element can take up forces acting on the side sill in case of a side impact and can deviate or divert the forces from one side of the vehicle seat to the other side. In particular, the transverse element can extend below the vehicle seat, for example below the seating area, but an arrangement behind the vehicle seat also can be considered. By the use of the transverse element above and separated from the undercarriage, the undercarriage itself can be constructed less rigid and thus lighter and a centrally arranged battery can be better protected.

The transverse element can be adapted to take-up compressive forces in order to deviate these around a user, for example in case of a side impact. The transverse element can also be adapted in order to take-up tractive forces, for example to pretend or limit a bracing of the side sill element in case of a front or rear impact.

The transverse element and can be adapted to deform if pressure and/or tractive forces are applied, in particular if the forces occurring in an impact or crash excess a predetermined value. The transverse element can also be adapted to deform in a predetermined direction if forces are applied to it. In case of an arrangement of the transverse element below the seat element, the predetermined direction can be downwards and/or towards the front. A person skilled in the art, however, will predetermine the direction in order to minimize an exposure for the occupant and, if applicable, for the battery or accumulator.

The transverse element can be a bar, a bracer, a hollow profile, a tube, or can be implemented in another way. The transverse element can also be integrated in a composite design into the vehicle frame.

The side sill and/or the undercarriage portion of the vehicle frame can each or together provide a mono-type tube design and can be fitted together from a plurality of profile elements bracers or bars. These elements, however, can also be made from composite materials.

The side sill may comprise an upper longitudinal element and at least one support element. The support element is arranged substantially vertical with respect to a side view and can mean that the support element extends from the upper longitudinal element in the vertical direction, for example downwards. The support element can also extend in a direction towards the interior or the exterior with respect to the vehicle or the vehicle frame and can, for example connect the upper longitudinal element with an element of the undercarriage such as an undercarriage bar or bottom. The undercarriage bar can be arranged further to the inside with respect to the vehicle frame compared to the upper longitudinal element. The support element can be formed as a bar or bracer.

The upper longitudinal element can be a substantially horizontal longitudinal bar or bracer which is arranged, for example, parallel to the road.

Further elements can be provided besides the support or enforcement element, for example diagonally arranged diagonal elements which connect the upper longitudinal element to the undercarriage. The expressions "vertical" and "diagonal" relate to the side view and the elements can be oriented towards the inside or to the exterior.

The side sill or the longitudinal element and/or the upper longitudinal bar or bracer can comprise a node with the at least one support element and possibly further elements. The node is arranged at a side of and above with respect to at least one portion of a seating area of the vehicle seat if the vehicle seat is in a driving position. The node is adapted for the take-up of and for deviating impact forces and can effectively deviate forces occurring in case of a side impact and keep them away from the occupant and the vehicle seat.

The node can be arranged besides the occupant, at a position, where vehicle door openings or doors are positioned in a common vehicle.

The transverse element can be connected to the support element such that forces acting on the node can be deviated via the support element towards the transverse element. The arrangement at the supporting element makes it possible to adapt the height of the transverse element to the requirements to the required space in the vehicle. A higher positioning results in a better force transmission and allows designing the elements lighter. The transverse element can also be connected to the longitudinal element and/or the node. The transverse element can be bent or curved, for example, in order to arrange the transverse element under the vehicle seat.

The invention also relates to a vehicle seat which is adjustable and least between a driving position and an access position, wherein a seating area of the vehicle seat is substantially horizontal in the access position and inclined to the rear with respect to the access position in the driving position. Such a vehicle seat can be advantageous if used with the above described vehicle frame and makes the entry to and exit from such a vehicle considerably easier. The vehicle seat, however, can also be used with any other vehicle in which the seating area of the vehicle seat is, in a driving position, arranged between fixed elements such as a frame structure or the side sill. The adjustment of the vehicle seat into the access position which can be used for the entry to the vehicle as well as to the exit from the vehicle provides a comfortable access to the vehicle. The seating area of the vehicle seat can be arranged in parallel to the upper edge of the side sill or of an upper frame element in the access position. The expression "substantially horizontal" relates to orientation of the seating area when the vehicle seat is arranged in an operating vehicle and can include an angle of inclination of a about ±15° to the front or to the rear. A small inclination to the side is also possible. The inclination can thereby be adapted to an inclination of the upper edge of the side sill and can be substantially parallel to this inclination.

The seating area of the vehicle seat is in the driving position, inclined or tilted by more than 15° to the rear with respect to the access position, for example about 2.5° to 40°.

The vehicle seat can additionally comprise a lifting device to move at least the seating area from the driving position into the access position. The lifting device can comprise a gas pressure spring, a hydraulic system and/or an electric drive.

This seating area of the vehicle seat can be connected substantially rigid to a backrest such that the backrest moves together with the movement into the access position. The seating area can, however, be also provided separated from the backrest such that the seating area can be brought into the access position independently from the backrest.

The vehicle seat can comprise at least one front axis of rotation about which the vehicle seat is rotatably supported in order to be adjustable between the driving position and the access position and vice versa. The axis of rotation can be a shaft or an axis which is rotatably supported in at least one bearing point. The bearing point or the axis of rotation can be arranged in the front portion of the seating area, for example in the area around the front edge of the seating area. The axis of rotation can be arranged substantially in the height of the seating area or below. For example, a three point support can be provided to reduce the weight, for example with two axis bearings in the front part of the seating area and one linkage to the lifting element in the rear portion of the vehicle seat such as for example in the rear portion of the seating area or at the backrest.

The axis of rotation can also be implemented in a pivoting mechanism which allows moving the seating area upwards. The axis of rotation does not have to correspond to the physical axis and can for example be arranged approximately in the height of the undercarriage or above.

The vehicle seat can be movably supported, in particular in the driving position. For example, the seating area can be movable about the axis of rotation wherein the movement is damped. A gas pressure damper or another damping element can be provided for damping. The damping element can be the lifting element.

A vehicle seat can further comprise at least one buffer element. The buffer element can be arranged at the side or also behind the backrest. The buffer element is energy absorbing and can be used for absorption of impact energy. The buffer element can be an energy absorbing foam, for example a metallic foam and can be supported by or attached to a frame element.

The invention also relates to the combination of a vehicle frame and a vehicle seat, wherein the vehicle seat is movable between at least a driving position and access position, wherein at least a portion of a seating area of the vehicle seat is arranged, in the driving position, below an upper edge of a side sill of the vehicle frame and at least one portion of the seating area of the vehicle seat is, in the access position, substantially in the same height as the upper edge of the side sill or higher.

The upper edge of the side sill can be formed by the upper longitudinal element, in particular by the upper longitudinal rod or bracer.

The vehicle seat can be fixed in its longitudinal position in the vehicle frame. This ensures that the side sills and in particular nodes provided therein can fulfill their protection function in an optimized way.

At least the front bearing points of the vehicle seat can be connected with an undercarriage of the vehicle frame. It is also possible that all bearing points are exclusively linked to the undercarriage. In this way, the vehicle seat is de-coupled from the side sill is and other elements of the vehicle frame which increases crash safety. The undercarriage can be a base plate and/or can comprise a plurality of bracers, bars or other elements.

At least one headrest can be adjustably arranged at the vehicle frame. The headrest can be movable in a longitudinal direction, can be movable in height and/or can be pivotable. The headrest can be arranged at the vehicle frame such that it is independent from the corresponding vehicle seat and does not follow movements or adjustments of the vehicle seat.

A passive energy absorbing device can be arranged between an element of the vehicle frame and the vehicle seat. The energy absorbing device can be arranged such that it is positioned at the side of an occupant of the vehicle seat when the vehicle seat is in driving position. The energy absorbing device can be an energy absorbing foam and does not comprise any active elements such as for example a conventional airbag.

SHORT DESCRIPTION OF THE FIGURES

The following description of examples of embodiments is given with respect to the attached figures in which.

DETAILED DESCRIPTION

The following description relates to an example of a vehicle frame according to the present disclosure and to elements arranged at such frame The examples shown are, however, not limiting to the scope of the invention as defined by the wording of the claims.

Figure 1:
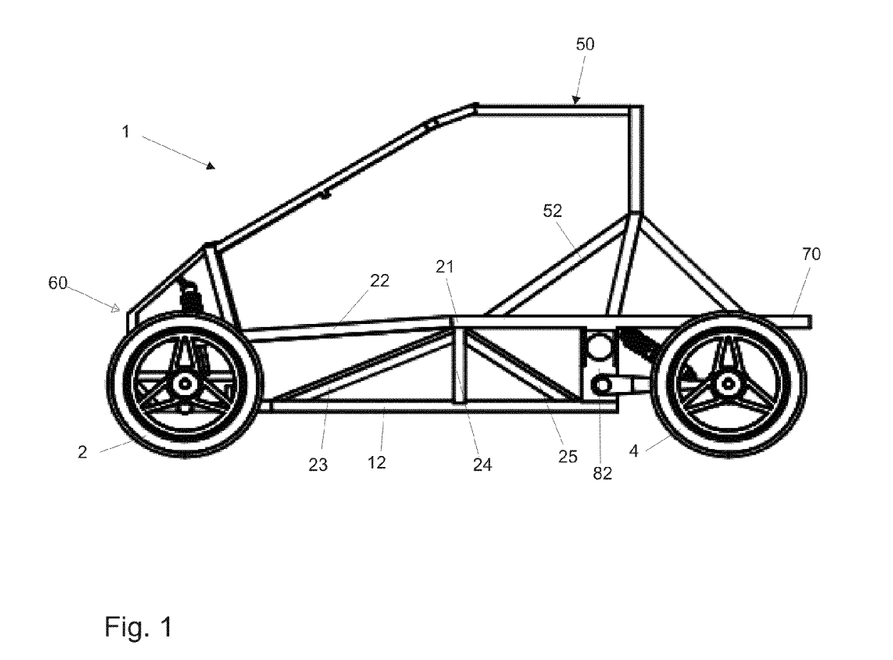
FIG. 1 shows a side view of a vehicle frame.

FIG. 1 shows a vehicle according to the present disclosure with a vehicle frame 1 according to the present disclosure. At the vehicle frame illustrated in the example front wheels 2 and rear wheels 4 are shown, which are attached by a longitudinal or transverse control arm and by suspensions elements in a way generally known in the field of motor vehicles. The wheel suspensions and other components of the chassis, which can be attached to the vehicle frame can correspond to known chassis types and shaft suspensions and can be used with the present disclosure.

Furthermore, the shown vehicle frame 1 is adapted to a vehicle with four wheels, the vehicle frame, however, can be adapted to a vehicle with three wheels or to another multi-track or single-track vehicle.

In addition, further elements can be attached to the vehicle frame such as body elements, drives, interiors, seat and other components commonly used in a vehicle. It is possible to use known elements and devices or devices specifically adapted to the present frame design.

The vehicle frame is particularly useful with light vehicles below 400 kg (without batteries), but can also be used with heavier vehicles. The vehicle frame for one person shown as an example in the figures can have, due to its weight optimised design, a weight or mass of about 50 kg or less, in particular of about 35 kg or less while providing a good crash safety in particular at a side impact. In this way the vehicle weight in a ready to use sate (including battery) can be reached of about 300 kg or less, in particular of about 270 kg or less. The given masses relate to a single seat vehicle. Vehicles with two or more seats can also be designed correspondingly lighter.

The shown vehicle frame is a frame design, in which a plurality of bars or bracers are connected to each other. For example, hollow profiles made from aluminium, steel, or of any other suitable material can be used which are welded, riveted, nailed, adhered using an adhesive, placing pins or bolts or which are connected to each other by any other suitable fixation technology. The bars or brachers can be connected directly to each other or by nodes, additional elements or the like.

The frame comprises an undercarriage or bottom portion or an undercarriage 10 of which FIG. 1 only shows the left bottom bar 12. Additional elements of the bottom portion can be arranged behind the left side bottom bar 12 in the illustration of FIG. 1.

The vehicle frame further comprises a sill element or side sill 20, a roll-over protection 50, a front crash box 60 and a rear impact element 70. The front crash box 60 serves for the uptake of forces in case of a front impact and can deform in a predetermined manner. Such a front crash box is known in itself and can be adapted to the requirements of the vehicle frame 1 by a person skilled in the art. The rollover protection 50 comprises a plurality of frame elements which provide a functional and stable protection in a rollover situation of the vehicle.

The side sill 20 comprises in the example shown an upper side bar 22 and is connected by a support element 24, a front diagonal element 23 and a rear diagonal element 25 to the left side bottom rail 12 of the undercarriage 10. The front diagonal element 23 the support element 24 and the rear diagonal element 25 are connected to the upper side bar 22 at a node 21.

The side sill element or site sill 20 which is shown in FIG. 1 in relation ton the left-hand side of the vehicle can comprise corresponding, for example symmetric, elements at the right side sill 40 on the right-hand side of the vehicle.

A retainer for the rear axle 80 is additionally provided which connects the left bottom rail or bar 12 with the left upper side bar 22 and which is adapted to retain the axle control arm or the linkage of the suspension elements. Longitudinal or diagonal control arms of the rear wheel suspension are attached at the rear axle retainer 80. In addition, the rear axle retainer 80 can be adapted for retaining drive elements such as an electric motor.

Figure 2A:
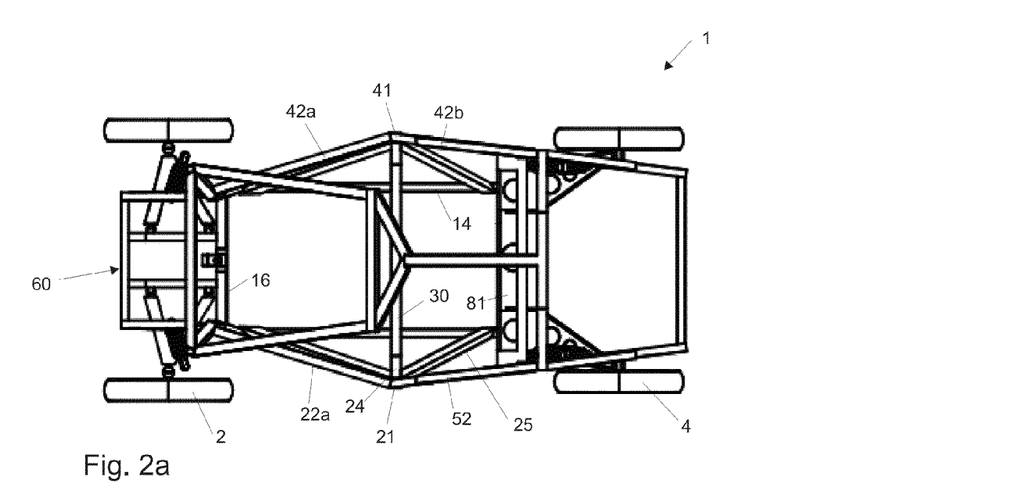
FIGS. 2a and 2b show the vehicle frame of FIG. 1 without and with an occupant.

FIG. 2A shows the vehicle frame of FIG. 1 in a top view. It can be seen that the vehicle is symmetric and the features described herein with respect to the left hand side of the vehicle are arranged mirror inverted on the right-hand side of the vehicle. Thus, a right upper side bar 42 is provided corresponding to the left upper side bar 22. This right upper side bar 42 and the left upper side bar 22 each provide in the area of the nodes 21, 41 a bend or break or curvature in the area of the nodes 21, 41 and turned to the outside such that the area of the node 21, 41 marks the broadest point of the vehicle frame 1. The area of the node means the node itself or the surrounding of the node. For example the bend, break or curvature can be arranged at a distance of some centimeters in front of the node. The upper side bars 22, 42 can be separated in a front portion 22a, 42a which is arranged in the driving direction in front of the node or bend and in a rear portion 22b, 42b which are arranged behind the node or bend. While the illustrated example shows that the front portion and the rear portion of the upper side bars 22, 42 are a continuous bar, it is also possible that separate front upper side bars 22a, 42a and rear upper side bar 22b, 42b are used which are connected to each other at the node 21, 41, respectively. In this respect the front upper side bar 22a, 42a can be directly connected to the rear upper side bar 22b, 42b and thereby from the node 21, 41. The node 21, 41, however, can also be formed as a separate element, for example made from cast aluminium, at which the front upper side bars 22*a*, 42*a* and the rear upper side bars 22*b* and 42*b* are attached.

It can also be seen that the undercarriage 10 can comprise in the illustrated example a left bottom bar or rail 12 and a right bottom bar or rail 14 which are connected to each other in the rear portion of the vehicle by the axle bearing 80 and in the front portion by an additional transverse bar 16. In the example shown, the undercarriage does not comprise any additional elements, in particular no additional elements connecting the right bottom bar with the left bottom bar in the area of the vehicle centre. However, it is possible to provide additional bottom elements which connect the left bottom bar 12 and the right bottom bar 14.

The vehicle frame comprises the upper longitudinal bars 22 and 42 in order to deviate forces occurring onto the vehicle frame in case of a side impact, wherein the upper longitudinal bars 22 and 42 are each supported by the undercarriage via a support bar or node bar 24, 44 which are connected to the left bottom bar 12 or the right bottom bar 14, respectively. In addition, a transverse bar 30 is provided which connects, in the example shown, the left support bar 24 and the right support bar 44. This transverse bar 30 is arranged above and separated from the undercarriage 10.

Alternatively or in addition to the transverse bar 30, a transverse bar can be attached between the rear diagonal elements 25, 45 and/or between the front diagonal elements 23, 43 in order to achieve a corresponding force deviation in case of a side impact and to obtain the required stability of the vehicle frame. A more detailed arrangement of the transverse bar is described in more detail below with respect to FIGS. 4*a*, 4*b* and 5.

It is noted that in the example shown, the upper side bars 22, 24 are arranged exterior to the left bottom bar 12 and to the right bottom bar 14, respectively, such that in case of a side impact first the respective upper side bar 22 or 42 takes up impact forces first. As a consequence the left support bar 24 and the right support bar 44 as well as diagonal bars 23, 43 and 25, 45 do not extend directly vertical but are each inclined inwards towards the center of the vehicle. This is advantageous in the deviation of the forces away from the node.

Figure 2B:
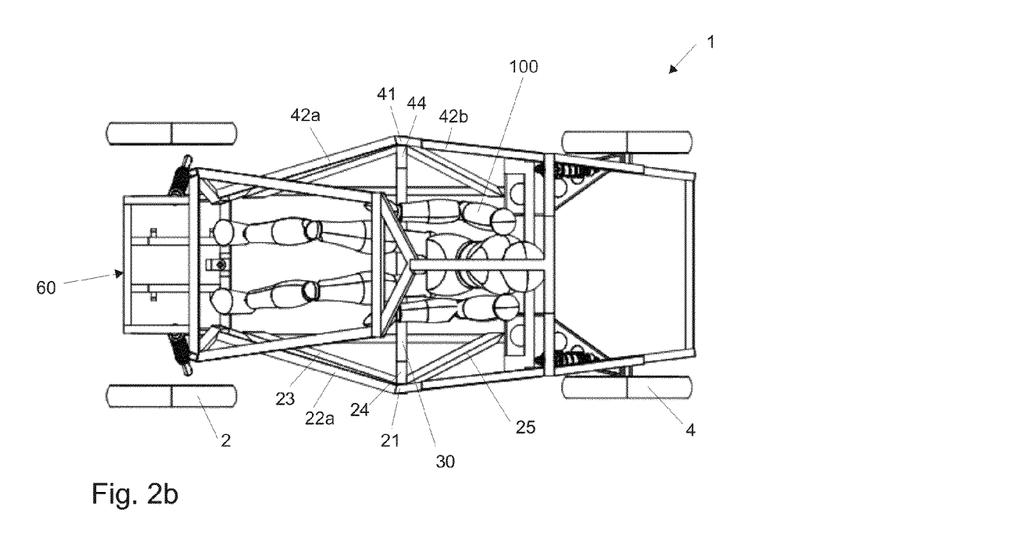

FIG. 2*b* shows the vehicle frame of FIG. 2*a* with a person or occupant 100 present in the vehicle. It can be seen that the illustrated vehicle is a one-person vehicle. The geometry of the frame can be extended, however, to vehicles with two or more seats, wherein the seats for occupants can be arranged beside each other and/or behind each other. A person skilled in the art will modify the frame structure with suitable measures. In case of a vehicle with seats that arranged beside each other a hump or tunnel can be provided between the seats and the transverse bar 30 can be supported by this hump or tunnel.

It can also be seen from FIG. 2*b* that the left node 21 and the right note 41 are each arranged at the side of the occupant, approximately in the area of a thigh of the occupant.

The crash box 60 is further arranged in front of the front bottom transverse bar 16 and the legs or feet of the occupant 100 do not reach into the crash box 60 such that the extremities of the occupant are well protected in case of a front impact.

In contrast to FIG. 2*a*, the front axle arms or the transverse bars are not shown in FIG. 2*b* to make clear which elements are part of the vehicle frame.

Figure 3A:
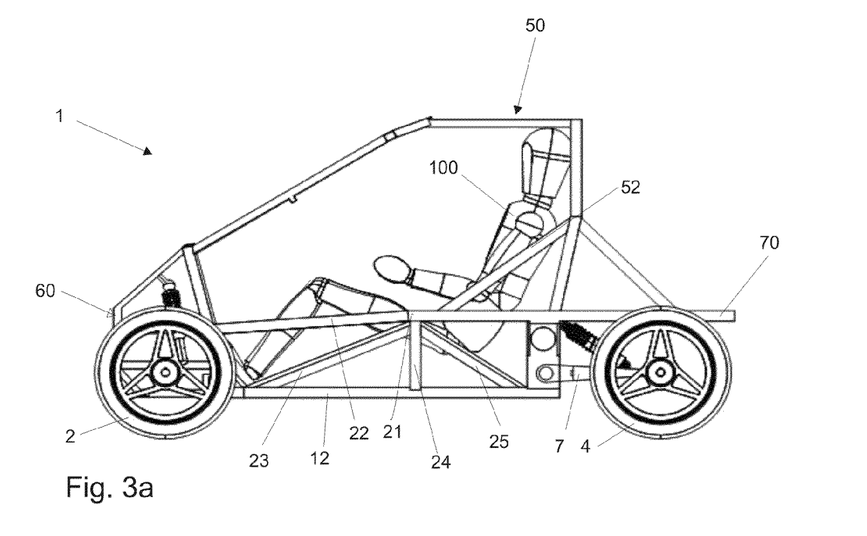
FIG. 3a shows the vehicle frame of FIG. 1 with an occupant placed therein and FIG. 3B shows a magnification of the side impact protection elements.

FIG. 3*a* shows the vehicle frame of FIG. 1 with a person or occupant placed therein. The figure corresponds to the side view of FIG. 2*b*. The occupant 100 is shown in a seating position which corresponds to the driving position, which is the position of the occupant 100 if he/she drives the vehicle. Besides this driving position, other positions such as an exit position or an access or entry position can be provided.

The node 21 is thereby arranged at the site and at the same height as the thigh of the occupant 100. The upper side bar 22 is also arranged on the same height and at the side of the occupant 100 such that it can deviate impact forces around the occupant. This is not the case in conventional vehicles as a vehicle door is usually arranged at the side of the occupant which requires a very rigid and therefore heavy door frame for taking up impact forces. Also the vehicle door itself has to be adapted for the uptake of impact forces and is correspondingly heavy. Due to the arrangement of the nodes at the side of and in the same height as the occupant, the frame design can be less massive without reducing the safety for the occupant. It is particularly advantageous that the seating area of the vehicle seat (not shown) or at least a portion of the seating area is arranged below the upper side bar 22, in particular below the rear portion of the upper side bar 22*b*. In order to further increase the safety in case of a side impact, an upper diagonal bar 52 is provided which supports the rollover protection 50 at the upper side bar 22 and which runs at the side of the upper part of the body of the occupant 100. This upper diagonal bar can be arranged in the area of the node 21 or at the upper side bar 21. In order to facilitate the entry to or exit from the vehicle, the upper diagonal bar 52 can be arranged in driving direction behind the node 21 that is in the rear portion 22*b* of the upper side bar 22.

In the vehicle frame shown, the vehicle doors are arranged on top of the side sills 20, 40. As all impact forces are taken up in the frame structure itself, the vehicle doors can be designed lighter.

Figure 3B:
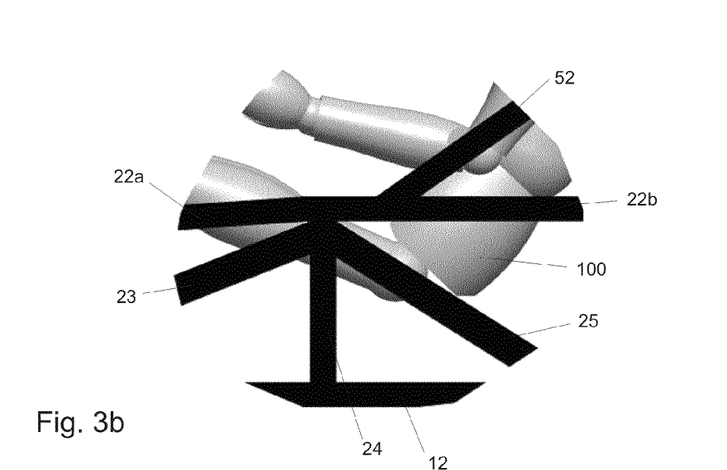

The arrangement of the node 21 and of the corresponding bars is shown in FIG. 3*b* in a magnification. It becomes apparent here again that important parts of the occupant 100 are protected at the sides by the side sill element 20 and/or the upper diagonal bar 52 when the occupant is in the driving position in the vehicle 1.

The note 21 can be arranged in a continuous side bar 22 and can mark the point at which the support bar 24 is attached to the side bar 22. The node 21, however, can be a separate element, such as for example a sleeve, a node or another element at which are attached at least the support bar 24, the front upper side bar 22*a*, and the rear upper side bar 22*b*.

Figure 4A:
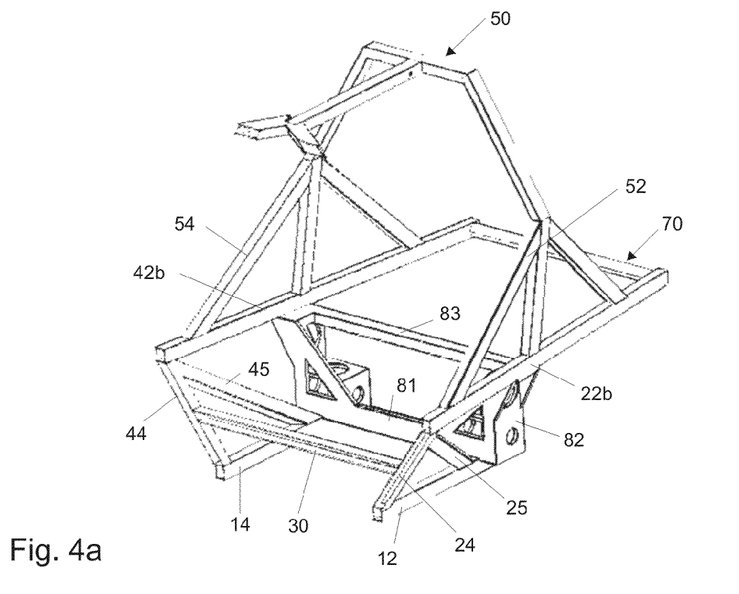
FIGS. 4a and 4b show an angular view of the rear portion of the frame of FIG. 1, with and without a seat arranged therein.

FIG. 4*a* shows the rear part of the frame design of the preceding figures. The area in front of the node 21, 41 and in front of the support bar 24, 44 in the driving direction are left out for a better understanding of the figure.

The arrangement of the transverse bar 30 becomes evident in the diagonal view wherein the transverse bar 30 connects the left support bar 24 and the right support bar 44. The transverse bar 30 is arranged above the undercarriage 10 that means in particular above the left bottom bar 12 and above the right bottom bar or 14. The transverse bar 30 is also arranged below the left node 21 and below the right node 41 and is adapted to transmit forces applied to the left node 21 or to the left upper side bar 22 in case of an side impact via the left support bar 24 to the right support bar 44 and the right frame elements. Impact forces can thereby be transmitted around an occupant in the vehicle. The vehicle seat which is not shown in FIG. 4*a* is arranged above the transverse bar 30. The transverse bar 30 may be arranged below the seating area. The traverse bar 30 may also be designed to bend or otherwise deform in a pre-determined direction, for example downward or towards the front to absorb impact forces, for example is these forces exceed a predetermined value.

The transverse bar 30 may also be designed to take up tractive forces to avoid or limit a movement of the upper side elements 22, 24 and/or of the bottom bars 12, 14 to the outer sides in case of a front impact or rear impact. The upper side bars 22, 42 have a tendency to deform outwards in case of a front impact or rear crash, due to the bent in the area of the node 21, 41. The transverse bar 30 gets a tractive load and takes up these forces.

In addition to the transverse bar 30, the axle retainer 80 can comprise an additional transverse bar 83 which connects the rear portion 22b of the left upper bar 22 with the rear portion 42b of the rear upper bar 42. This additional transverse bar 83 is arranged and behind the vehicle seat and can also take up pressure and tractive forces.

Figure 4B:
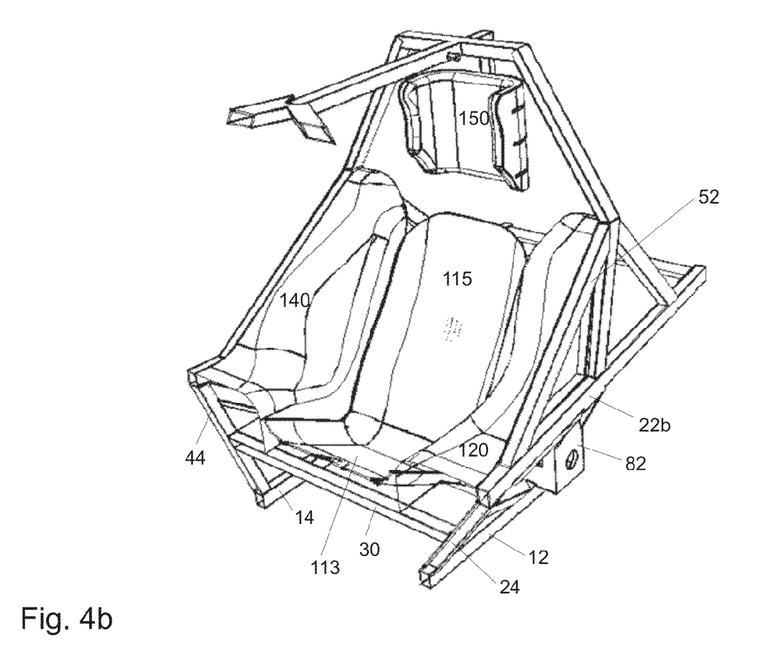

FIG. 4b shows a similar illustration to FIG. 4a, wherein a vehicle seat 110 is arranged in the vehicle frame. The vehicle seat 110 comprises a back rest 115 which is arranged in front of the axle retainer 80 and thus in front of the axle retainer transverse bar 83 which is hidden behind the back rest 115 in FIG. 4b.

The vehicle seat 110 also comprises a seating area 113 which is arranged above the transverse bar 30. That means that the transverse bar 30 traverses below the seating area 113 from one side of the seat to the other. The transverse bar 30 is thus longer than the width of the seating area 113. The seating area 113 is shown in the sectionals view of FIG. 4b cut-through and extends further to the front. The seating area 113 is thereby inclined to the back in the driving direction and can be at least partially arranged on the same height or below the transverse bar 30. Furthermore, the seating area 113 and the backrest 115 can be rigidly connected, that means without any articulation joint or joining device.

A head rest 150 is provided in addition to the seat 110. The head rest 150 comprises a left side protection element 152 and a right side protection element 154 which can support the head at the side. The headrest 150 can be arranged at the vehicle frame 1 separately from the vehicle seat 110, in particular at an element of the roll-over protection element 50. The head rest 150 can be adjustably arranged at the frame 1 in particular in its height, inclination and/or its longitudinal position.

The head rest 150 is thereby independent from the vehicle seat 110 and can be independently adjustable. This enables a movable design of the seat 110 which is movable with respect to the vehicle frame 1, for example adjustable in height or pivotable, while the head rest remains in a predetermined position.

Figure 5:
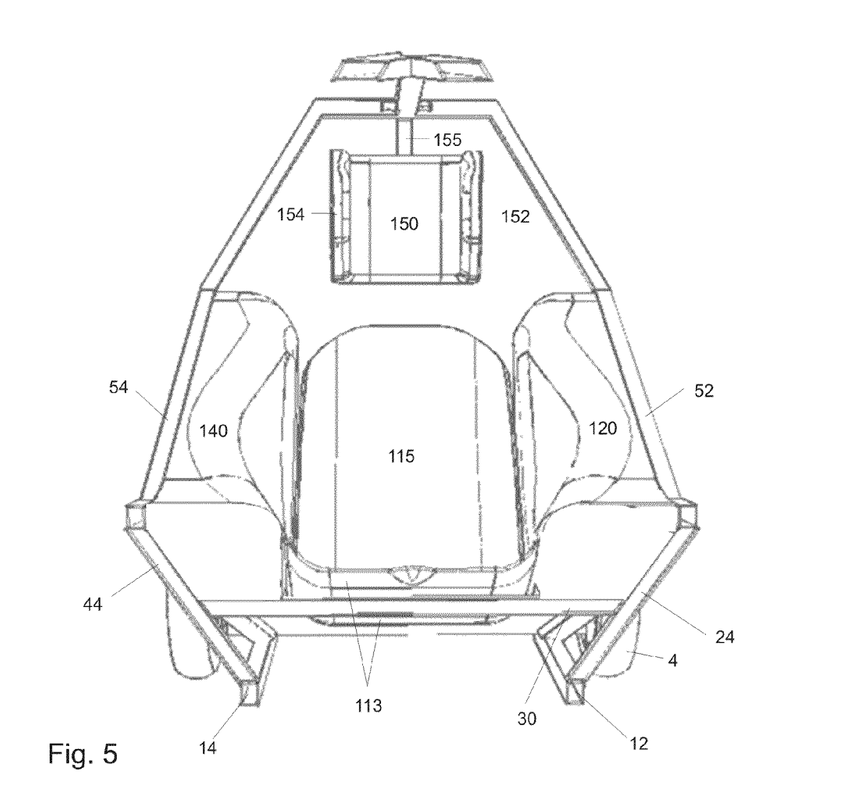
FIG. 5 shows the vehicle frame with the seat in a top view.

A side impact protection 120 is further arranged between the left upper diagonal element 52 (on the right-hand side of FIG. 5) and the vehicle seat 110. A right side impact protection element 140 is arranged on the right-hand side of the vehicle (shown on the left hand side of FIG. 5) between in the right upper diagonal bar 54 or the right upper side bar 42 and the vehicle seat 110. The left impact element 120 and the right impact element 140 are fixed to the frame. The left impact element 120 and the right impact element 140 fill the intermediate space between the frame 1 and the vehicle seat and can serve as an arm support for an occupant of the vehicle, but can also take up forces in case of a side impact and at a corresponding deformation of the vehicle frame 1. The impact elements 120, 140 are passive elements and can be made from an energy absorbing and/or deformable or malleable material such as for example a deformable foam. Such materials are known in the art and can be used with the present vehicle frame. These fixed side impact elements can absorb large amounts of impact energy and can keep the occupant on the vehicle seat 110 free therefrom. The impact elements 120, 140 act therefore similar to side airbags, while active elements such as pyrotechnical or expensive ignition mechanisms can be omitted. The impact elements 120, 140 can, however, be used in addition to airbags. FIG. 5 shows the element of the 4b in an upfront perspective and in a side few directly in front of node 21, 41 and the transverse bar 30. It appears from this figure that the headrest 150 is attached by a mounting 155 to the rollover protection 50 and that it is independent from the vehicle seat 110.

The additional elements correspond to those of FIG. 4b, wherein additionally the rear wheels 4,5 are indicated.

Figure 6:
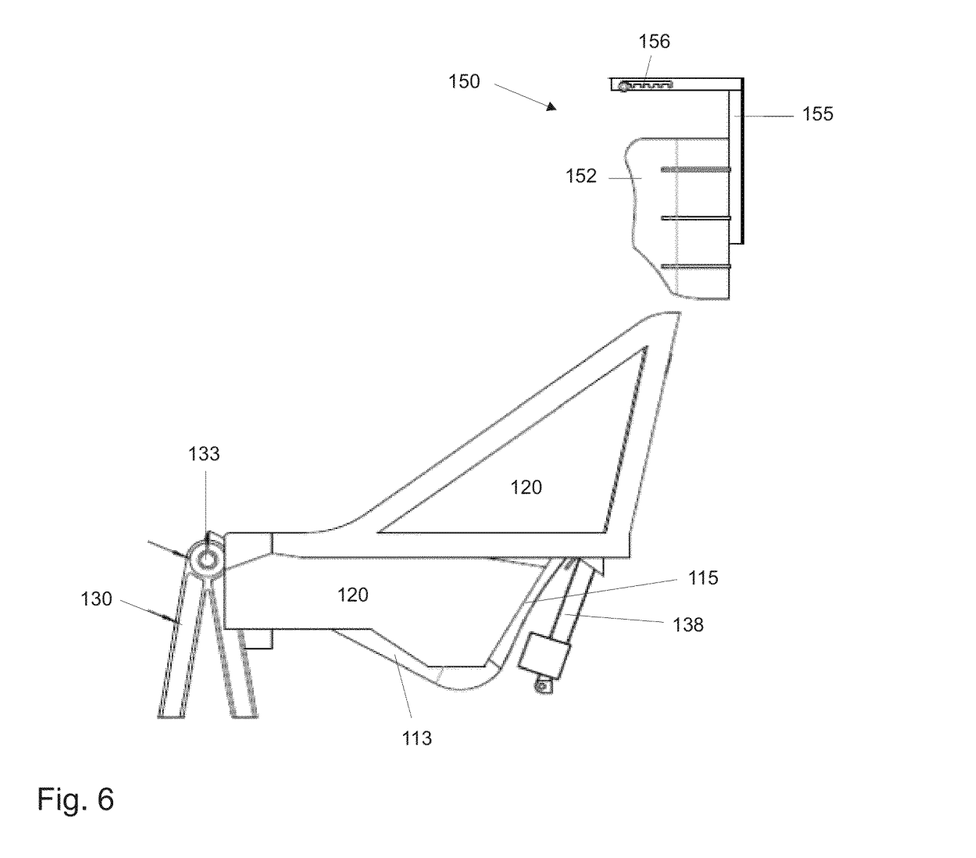
FIG. 6 shows a vehicle seat with the headrest.

FIG. 6 shows an example of a vehicle seat 110 and a head rest 150 without the vehicle frame 1. The vehicle seat comprises a seat area 113 and a backrest 115 fixedly attached to it. The seating area 113 is rotatably attached at its front area to a front seat support 130, rotatable about an axis 133 that is transverse to the driving direction. This rotatable support 133 allows the vehicle seat 110 to pivot upward from the shown driving position. A gas pressure spring 138 can be arranged in the rear area of the seat to support this pivoting movement and to make it easier for the user, and to support a lever movement or a pivoting or turning movement of the seat. The suspension, which can be a gas pressure spring 138, can be in the same time a suspension for the seat 110 in driving conditions and can thereby increase the comfort for the occupant 100. The spring stiffness and the suspension comfort for the occupant can be adapted or adjusted depending on the stiffness of the gas pressure spring. This allows minimising the suspending elements of the seating area and of the backrest and fast and thus a lighter design of the seat 110.

The front seat support 130 is mounted to the bottom bars 12, 14 or to other elements of the undercarriage 10. The support or bearing of the vehicle seat 130 can be independent of the transverse bar 30 to increase crash safety.

As can be seen from FIG. 6, the headrest 150 is independent from the vehicle seat and is not moved when the vehicle seat is moved upward. This allows a large pivoting movement of the vehicle seat for entry and exit without the head rest coming into contact with the roof liner or the roll over protection 50 of the vehicle frame. This has the advantage that the vehicle seat 110 with the seating area 130 can be pivoted upward at least to a position where the seating area 113 is substantially horizontal or parallel to the upper side bar 22. This makes an exit or entry easier because the occupant can slide on to the substantially planar vehicle seat over the upper side bar 22 or 42 onto the seat. It is advantageous in this respect if the axis of rotation 133 of the front seat support 130 is arranged at a height or at least approximately at the height of the upper side bar 22, 42. The upper side bars 22, 42 and/or the seating area 113 can have a height of about 40 to 60 cm above the ground in the access position when the vehicle is in an operating state.

Figure 7:
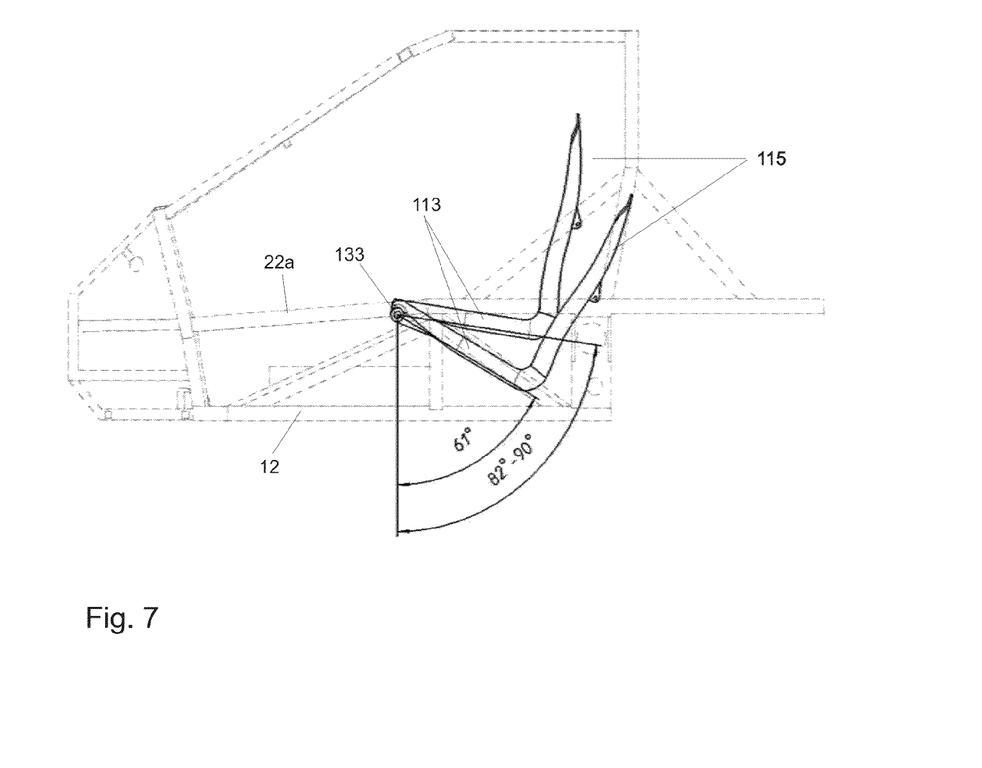
FIG. 7 shows a vehicle seat movably arranged in the vehicle frame.

FIG. 7 shows the vehicle seat 110 adjustably arranged in the vehicle frame 1. The vehicle seat is shown in the driving position as well as pivoted upward to the access position. The vehicle seat 110 is turned around the rotatable support 133. The seating area 113 is in the driving position inclined backward with respect to the horizontal line by about 30° to 40°, in the example shown by 39° (61° with respect to the vertical line). The seating area 113 of the vehicle seat 110 is substantially parallel to the upper side bar 22 in the access position which can be used for exit or entry. In the example shown, the seating area 113 can be inclined backward with respect to the horizontal line by about 0° to 8°.

The examples of the vehicle frame shown herein and of a vehicle seat arranged therein relate to a vehicle frame which can be assembled from square profiles, for example made from aluminium or any other suitable material, using known techniques such as welding, gluing, adhering or other technologies known to a person skilled in the art. A skilled in the art knows further materials and shapes of the bars that can be used with the present disclosure. For example circular profiles, T-profiles or other forms can be formed to a monotype frame wherein the geometries of the frame can be adapted to the materials and to the characteristics of the materials. These modifications will be handled by a person skilled in the art. The schematic figures also show all rods and bars in the same size and dimension. The dimension, material thickness and strength of the individual bars or bracers can be adapted for each individual bar or bracer differently.

The frame and design an the ideas it is based on can be transferred to composite materials wherein in composite materials the individual bars are not implemented as separate elements. Corresponding reinforcement elements can be provided which can take up similar forces and which take up the function of the bars or bracers.

All directions and relations mentioned and described in the present description, such as left, right, left hand side, right hand side as well as up, down, front, rear or upward, downward are in all cases related to the main driving direction of the vehicle.

The expression "battery" as used herein is to be understood as an electric energy storage and comprises in particular rechargeable secondary batteries, fuel cells or reservoirs.

While the present description has been given in relation to a particularly light small vehicle which is particularly useful for electric drive it is evident to a person skilled in the art that the features of the invention can be transferred to other frame designs and is in particular to larger or smaller vehicles without deviating from the scope of the invention.

What is claimed is:

1. A vehicle frame comprising:
a vehicle seat arranged at the vehicle frame, wherein the vehicle seat is moveable between at least a driving position and an access position, wherein at least one portion of a seating area of the vehicle seat is arranged below an upper edge of a side sill of the vehicle frame in a driving position and at least one portion of the seating area of the vehicle seat is substantially on a same height as the upper edge of the side sill or higher in the access position.

2. The vehicle frame of claim 1,
wherein the vehicle frame forms a safety cell together with the at least one vehicle seat,
wherein the vehicle frame comprises at least one base portion and at least one transverse element for taking up transverse forces,
wherein the at least one transverse element is connected with the side sill and extends to both sides of the at least one vehicle seat, and
wherein the at least one transverse element is arranged below the vehicle seat.

3. The vehicle frame of claim 1, wherein the vehicle seat is fixed with respect to a longitudinal position in the vehicle frame in the driving position.

4. The vehicle frame of claim 1, wherein at least front suspension points of the vehicle frame are connected with a bottom section of the vehicle frame.

5. The vehicle frame of claim 1, further comprising:
at least one headrest which is adjustably mounted to the vehicle frame.

6. The vehicle frame of claim 1, further comprising:
at least one passive energy absorbing element, which is arranged at a side of the vehicle seat, when the vehicle seat is in the driving position.

7. The vehicle seat of claim 1, further comprising:
a lifting device arranged at the vehicle seat and at a vehicle frame to bring the seating area from the driving position to the access position.

* * * * *